United States Patent
Verma et al.

(10) Patent No.: US 10,341,492 B2
(45) Date of Patent: Jul. 2, 2019

(54) METHOD, DEVICE, AND SYSTEM TO NOTIFY A CALL TRANSFER EVENT FROM A FIRST DEVICE TO A SECOND DEVICE

(71) Applicant: APPLE INC., Cupertino, CA (US)

(72) Inventors: Sanjay K. Verma, San Jose, CA (US); Deepankar Bhattacharjee, Milpitas, CA (US); Prateek Sharma, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/274,265

(22) Filed: Sep. 23, 2016

(65) Prior Publication Data

US 2018/0091655 A1    Mar. 29, 2018

(51) Int. Cl.
*H04W 4/02* (2018.01)
*H04M 3/58* (2006.01)

(52) U.S. Cl.
CPC .............. *H04M 3/58* (2013.01); *H04W 4/023* (2013.01); *H04M 2203/2094* (2013.01); *H04M 2203/6081* (2013.01)

(58) Field of Classification Search
CPC ........... H04M 3/54; H04M 3/58; H04M 4/023
USPC ............ 455/417, 421, 422.1, 436, 444, 445, 455/456.1, 456.3, 41.2
See application file for complete search history.

(56) References Cited

U.S. PATENT DOCUMENTS

| 7,171,221 | B1 | 1/2007 | Amin et al. |
| 8,639,230 | B2 | 1/2014 | Williams et al. |
| 9,100,488 | B2 | 8/2015 | Lovitt et al. |
| 9,571,995 | B1* | 2/2017 | Scheer ..................... H04W 4/16 |
| 9,641,954 | B1* | 5/2017 | Typrin ..................... H04W 4/00 |
| 2003/0073431 | A1* | 4/2003 | Dorenbosch .......... H04M 1/006 455/417 |
| 2007/0263828 | A1* | 11/2007 | Lee .................... H04M 3/42263 379/212.01 |
| 2008/0260136 | A1* | 10/2008 | Rahman .................. H04M 3/54 379/211.02 |
| 2013/0157636 | A1 | 6/2013 | Ryan |
| 2013/0182597 | A1* | 7/2013 | Chiang ............... H04W 88/182 370/252 |
| 2014/0298434 | A1* | 10/2014 | Prchal ................... H04W 4/026 726/7 |
| 2015/0099505 | A1* | 4/2015 | Kiukkonen ......... H04M 1/7253 455/419 |

(Continued)

*Primary Examiner* — Congvan Tran
(74) *Attorney, Agent, or Firm* — Fay Kaplun & Marcin, LLP

(57) ABSTRACT

Method, device, and system being performed by a first station. The method includes receiving a first call identification of a first communication session between the first station and a second station. The method further includes receiving a request, from a third station, to allow the first communication session to be transferred from the first station to the third station. Following the receipt of the request, the method includes displaying a prompt on the first station for permission to allow the first communication session to be transferred to the third station and, when the permission is received, transmitting a response, to the third station, granting permission to transfer the first communication session from the first station to the third station. Additionally, upon the call being transferred, an advisory, such as an audio or visual message, may alert the second client station of the call transfer event.

20 Claims, 7 Drawing Sheets

(56) References Cited

U.S. PATENT DOCUMENTS

| | | | |
|---|---|---|---|
| 2015/0163295 A1 | 6/2015 | Shmilov et al. | |
| 2015/0237207 A1* | 8/2015 | Ordille | G06F 21/45 379/204.01 |
| 2016/0381215 A1* | 12/2016 | Goyal | G06F 16/29 379/142.09 |
| 2018/0027120 A1* | 1/2018 | Peterson | H04M 1/72569 |

* cited by examiner

METHOD, DEVICE, AND SYSTEM TO NOTIFY A CALL TRANSFER EVENT FROM A FIRST DEVICE TO A SECOND DEVICE

BACKGROUND INFORMATION

A user may utilize a plurality of different stations (e.g., electronic devices) that are each capable of connecting to one or more networks. Examples of different devices may include a personal mobile phone, a work issued mobile phone, a tablet computer, a desktop computer, a VoIP phone, a phablet, a wearable, etc. Each station may be capable of performing a telephony function or other functionality in which a communication session is established with a station of another user. The user may desire to continue the current communication session on a different device than the device with which communication session was originally established.

Alternatively, it may be desirable for a further user to continue the communication session on a different device in place of the user. However, a situation may arise when an unauthorized user may attempt, either accidentally or intentionally, to transfer the communication session onto the different device. For instance, a user may be engaged in a communication session on a tablet and the user's child, while using the user's smartphone, may inadvertently initiate a call transfer feature. As such, the user may also desire to have certain controls over a communication session transfer.

SUMMARY

In one exemplary embodiment, a method is performed by a first station. The method includes receiving a first call identification of a first communication session between the first station and a second station. The method further includes receiving a request, from a third station, to allow the first communication session to be transferred from the first station to the third station. Following the receipt of the request, the method includes displaying a prompt on the first station for permission to allow the first communication session to be transferred to the third station and, when the permission is received, transmitting a response, to the third station, granting permission to transfer the first communication session from the first station to the third station. Additionally, upon the call being transferred, an advisory, such as an audio or visual message, may alert the second client station of the call transfer event.

In a further exemplary embodiment described below, a method is performed by a first station. The method includes receiving a first call identification of a first communication session between a second station and a third station. The method further includes transmitting a request to allow the first communication session to be transferred from the second station to the first station, wherein the request displays a prompt on the second station for permission to allow the first communication session to be transferred to the first station. Next, the method includes receiving permission from the second station to transfer the first communication session from the second station to the first station and transmitting an invite including the first call identification and a second call identification to the third station, wherein the invite indicates to the third station that the first communication session with the second station is to be terminated and a second communication session with the first station is to be established, wherein the second communication session is identified by the second call identification. Finally, the method establishes the second communication session with the third station.

In another exemplary embodiment described below, a first station is disclosed. The first station has a transceiver that is configured to transmit data and receive data, wherein the data is associated with a first communication session, and a processor. The processor is configured to receive a first call identification of the first communication session between the first station and a second station and receive a request, from a third station, to allow the first communication session to be transferred from the first station to the third station. The processor is further configured to display a prompt on the first station for permission to allow the first communication session to be transferred to the third station and when the permission is received, transmit a response, to the third station, granting permission to transfer the first communication session from the first station to the third station.

DETAILED DESCRIPTION

Figure 1:
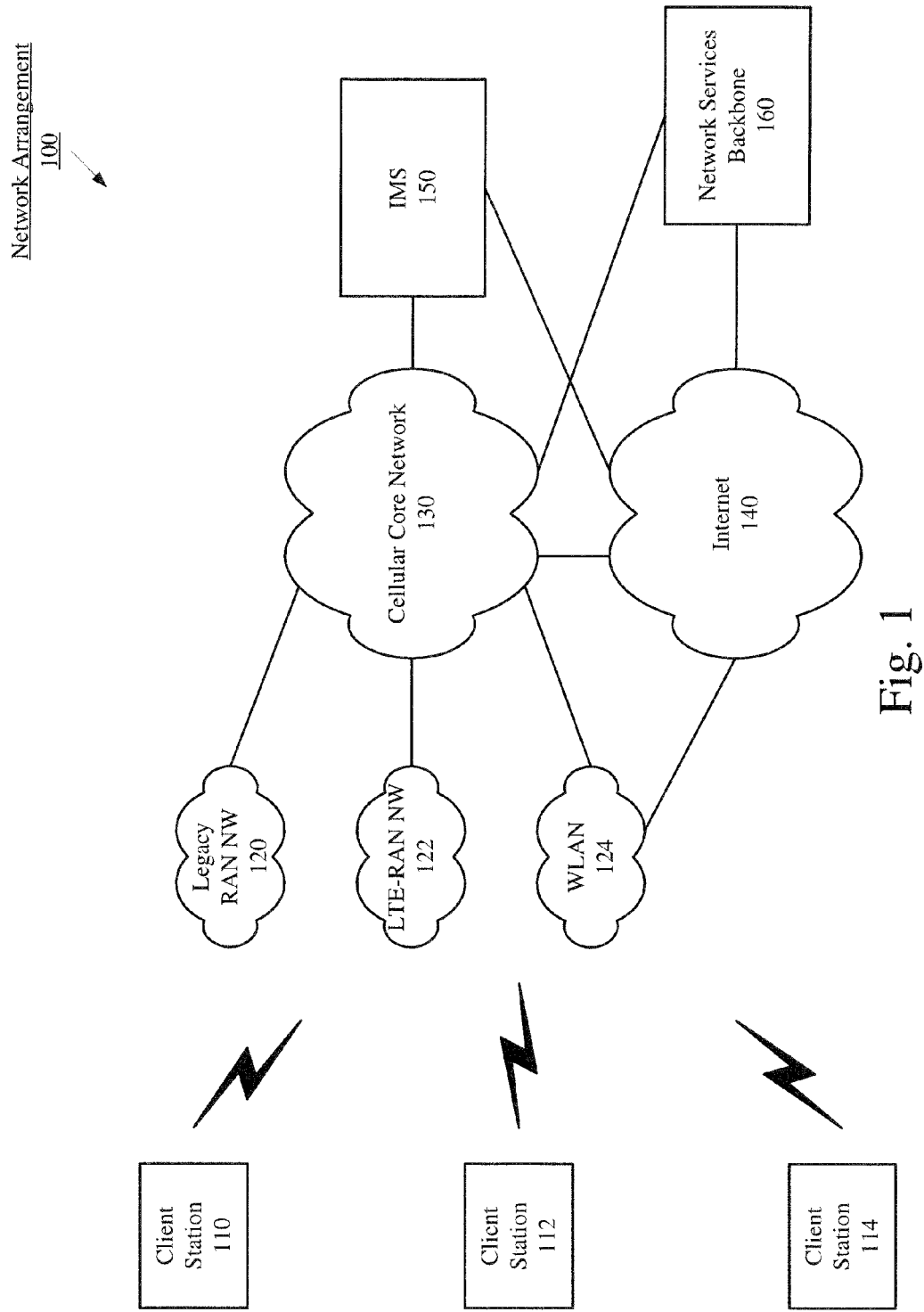
FIG. 1 shows an exemplary network arrangement, according to various embodiments described herein.

The exemplary embodiments may be further understood with reference to the following description and the related appended drawings, wherein like elements are provided with the same reference numerals. The exemplary embodiments are related to a system, device, and method for notifying a call transfer event from a first client station to a second client station where the first client station and the second client station are associated with a user account. Specifically, the association between the second client station and the first client station enables a call transfer notification to be propagated to the first client station upon a call transfer being initiated by the second client station during a call. Additionally, upon the call being transferred, an advisory, such as an audio or visual message, may alert a third client station of the call transfer event.

FIG. 1 shows an exemplary network arrangement 100, according to various embodiments described herein. The exemplary network arrangement 100 includes client stations 110-114. In this example, it is assumed that the client stations 100-114 are associated with a single user or a single user account. For example, the client station 110 may be the user's mobile phone, the client station 112 may be the user's tablet computer and the client station 114 may be the user's desktop computer. Those skilled in the art will understand that, in addition to the examples provided above, the client stations may be any type of electronic component that is configured to communicate via a network, e.g., smartphones, phablets, embedded devices, smart watches, etc. It should also be understood that an actual network arrangement may include any number of client stations associated with any number of users and that the user may be associated with more or less client stations. The example of three (3) client stations associated with one (1) user is only provided for illustrative purposes.

Each of the client stations 110-114 may be configured to communicate directly with one or more networks. In this example, the networks with which the client stations 110-114 may communicate are a legacy radio access network (RAN) 120, a Long Term Evolution radio access network (LTE-RAN) network 122 and a wireless local area network (WLAN) 124. In this example, each of the networks 120-124 is a wireless network with which the client stations 110-114 may communicate wirelessly. However, it should be understood that the client stations 110-114 may also communicate with other types of networks using a wired connection. It should also be understood that not all of the client stations 110-114 may communicate directly with each of the networks 120-124. For example, the client station 114 may not have an LTE chipset and therefore may not have the ability to communicate with the LTE-RAN 122. Again, the use of three (3) networks is only exemplary and there may be any other number of networks with which the client stations 110-114 may communicate.

The legacy RAN 120 and the LTE-RAN 122 are portions of cellular networks that may be deployed by cellular providers (e.g., Verizon, AT&T, Sprint, T-Mobile, etc.). These networks 120 and 122 may include, for example, base client stations (Node Bs, eNodeBs, HeNBs, etc.) that are configured to send and receive traffic from client stations that are equipped with the appropriate cellular chip set. Examples of the legacy RAN 120 may include those networks that are generally labeled as 2G and/or 3G networks and may include circuit switched voice calls and packet switched data operations. Those skilled in the art will understand that the cellular providers may also deploy other types of networks, including further evolutions of the cellular standards, within their cellular networks. The WLAN 124 may include any type of wireless local area network (WiFi, Hot Spot, IEEE 802.11x networks, etc.). Those skilled in the art will understand that there may be thousands, hundreds of thousands or more of different WLANs deployed in the United States alone. For example, the WLAN 124 may be the user's home network, the user's work network, a public network (e.g., at a city park, coffee shop, etc.). Generally, the WLAN 124 will include one or more access points that allow the client stations 110-114 to communicate with the WLAN 124.

In addition to the networks 120-124, the network arrangement 100 also includes a cellular core network 130 and the Internet 140. The cellular core network 130, the legacy RAN 120 and the LTE-RAN 122 may be considered a cellular network that is associated with a particular cellular provider (e.g., Verizon, AT&T, Sprint, T-Mobile, etc.). The cellular core network 130 may be considered to be the interconnected set of components that manages the operation and traffic of the cellular network. The interconnected components of the cellular core network 130 may include any number of components such as servers, switches, routers, etc. The cellular core network 130 also manages the traffic that flows between the cellular network and the Internet 140.

The network arrangement 100 also includes an IP Multimedia Subsystem (IMS) 150. The IMS 150 may be generally described as an architecture for delivering multimedia services to the client stations 110-114 using the IP protocol. The IMS 150 may include a variety of components to accomplish this task. For example, a typical IMS 150 includes a Home Subscriber Server (HSS) that stores subscription information for a user of the client stations 110-114. This subscription information is used to provide the correct multimedia services to the user. Other exemplary components of the IMS 150 will be described below, as needed. The IMS 150 may communicate with the cellular core network 130 and the Internet 140 to provide the multimedia services to the client stations 110-114. The IMS 150 is shown in close proximity to the cellular core network 130 because the cellular provider typically implements the functionality of the IMS 150. However, it is not necessary for this to be the case. The IMS 150 may be provided by another party.

Thus, the network arrangement 100 allows the client stations 110-114 to perform functionalities generally associated with computer and cellular networks. For example, the client stations 110-114 may perform voice calls to other parties, may browse the Internet 140 for information, may stream multimedia data to the client devices 110-114, etc.

In addition to the elements already described, the network arrangement 100 also includes a network services backbone 160 that is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the client stations 110-114 in communication with the various networks. The network services backbone 160 interacts with the client devices 110-114 and/or the networks 120, 122, 124, 130, 140 to provide these extended functionalities.

The network services backbone 160 may be provided by any entity or a set of entities. In one example, the network services backbone 160 is provided by the supplier of one or more of the client stations 110-114. In another example, the network services backbone 160 is provided by the cellular network provider. In still a further example, the network services backbone 160 is provided by a third party unrelated to the cellular network provider or the supplier of the client stations 110-114. It should be noted that the network services backbone 160 may be used to associate the client stations 110-114 with a user account such that a call identification of an established call may be propagated among the client stations 110-114. However, it should be understood that the network services backbone 160 may include many other components and services that may be used to enhance the operations of the client stations 110-114 and networks.

One of the services provided by the network services backbone 160 may be to store and update associations among the different client stations 110-114. As described above, in this example, each of these client stations 110-114 are associated with the same user. Thus, the network services backbone 160 may store information that indicates this association of the user with each of the client stations 110-114 and may then also store (or link) the relationship of the client stations 110-114 with each other based on their association with the user. This association among client stations 110-114 may be used as one of the bases for the network services backbone 160 to provide the enhanced operations of the client stations 110-114.

The exemplary embodiment of the system, device, and method determine whether a transfer notification is to be transmitted to a client station participating in an established call prior to another client station of a user transferring the active call to itself. As such, a transfer functionality may be performed by the selected one of the other client stations as a "grab" feature of an active call so the active call may continue on the selected one of the other client stations.

Figure 2:
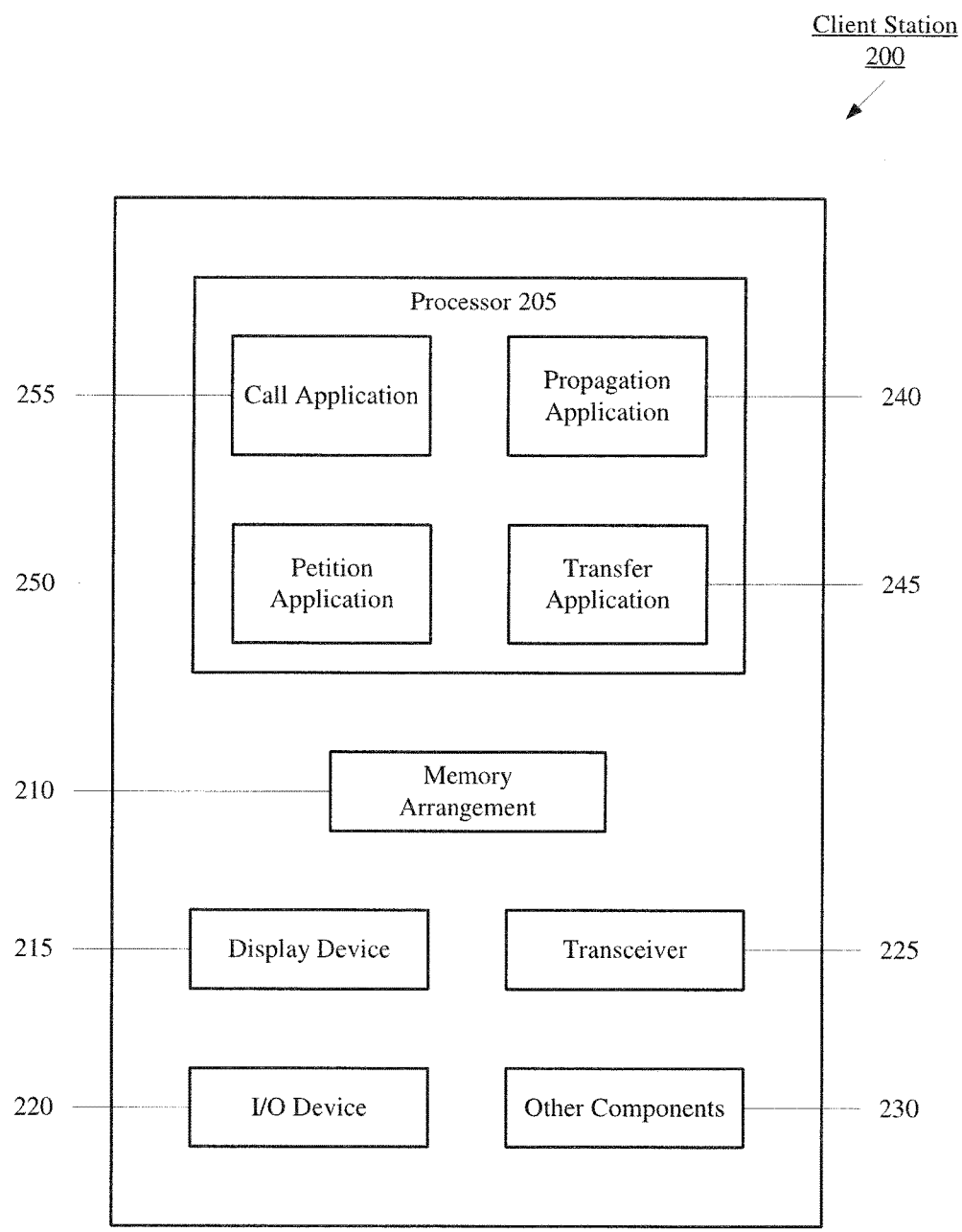
FIG. 2 shows an exemplary client station configured with a transfer functionality, according to various embodiments described herein.

FIG. 2 shows an exemplary client station 200 configured to petition the user as to whether a call transfer to other associated client stations may be performed, according to various embodiments described herein. The client station 200 may also be one of the other client stations to which the call may be transferred. The client station 200 may represent any electronic device that is configured to perform wireless functionalities and may be representative of one or more of the client stations 110-114. The client station 200 may be configured to perform cellular and/or WiFi functionalities. The client station 200 may include a processor 205, a memory arrangement 210, a display device 215, an input/output (I/O) device 220, a transceiver 225, and other components 230. The other components 230 may include, for example, an audio input device, an audio output device, a battery, a data acquisition device, ports to electrically connect the client station 200 to other electronic devices, etc.

The processor 205 may be configured to execute a plurality of applications of the client station 200. For example, the applications may include a web browser when connected to a communication network via the transceiver 225. In another example, the processor 205 may execute a call application 255 that enables the client station 200 to perform a call functionality. It should be note that the call functionality may refer to any type of communication session. For example, the communication session may be an audio only call functionality (e.g., phone call), an audio/video communication functionality, etc. However, for illustrative purposes, the communication session is represented as a call functionality herein. In yet another example, the processor 205 may execute a propagation application 240 and a petition application 250. As will be described in further detail below, the propagation application 240 may propagate or transmit a call identification for an established call to be provided to the other associated clients stations. The petition application 250 may determine whether the user is to confirm a call transfer and, in situations where a confirmation is needed, the petition application 250 may prompt the user with a transfer confirmation message. In a further example, the processor 205 may execute a transfer application 245. The transfer application 245 may grab an active call. For example, if the client station 200 is one of the other associated client stations and the petition application 250 permits the call transfer, the transfer application 245 may utilize a call identification that has already been provided to transfer the call to the call application 255 of the station 200.

It should be noted that the above noted applications each being an application (e.g., a program) executed by the processor 205 is only exemplary. The functionality associated with the applications may also be represented as a separate incorporated component of the client station 200 or may be a modular component coupled to the client station 200, e.g., an integrated circuit with or without firmware.

The memory 210 may be a hardware component configured to store data related to operations performed by the client station 200. Specifically, the memory 210 may store data related to the call application 255, the propagation application 240, the transfer application 245, and the petition application 250. For example, a call identification may be generated by the call application 255 or provided by the other participant of the call session. The call identification may be stored in the memory 210. The call identification may also be stored by the other associated client stations. The display device 215 may be a hardware component configured to show data to a user while the I/O device 220 may be a hardware component that enables the user to enter inputs. It should be noted that the display device 215 and the I/O device 220 may be separate components or integrated together such as a touchscreen.

The transceiver 225 may be a hardware component configured to transmit and/or receive data. That is, the transceiver 225 may enable communication with other electronic devices directly or indirectly through a network based upon an operating frequency of the network. The transceiver 225 may operate on a variety of different frequencies or channels (e.g., set of consecutive frequencies) that are related to the call functionality. Thus, an antenna (not shown) coupled with the transceiver 225 may enable the transceiver 225 to operate on a WiFi frequency band.

It should again be noted that since the client station 200 of FIG. 2 is representative of the client stations 110-114 of FIG. 1, each of the client stations 110-114 may all be configured with the above described components and applications. For example, the client stations 110-114 may be associated with each other based upon a common operating platform. An update to the operating platform may include the installation of the above noted applications. Accordingly, the client stations 110-114 may all be configured to participate in a call session using the call application 255, propagate a call identification for the call session to the other client stations, and transfer the call session from the participating client station to itself.

Figure 3:
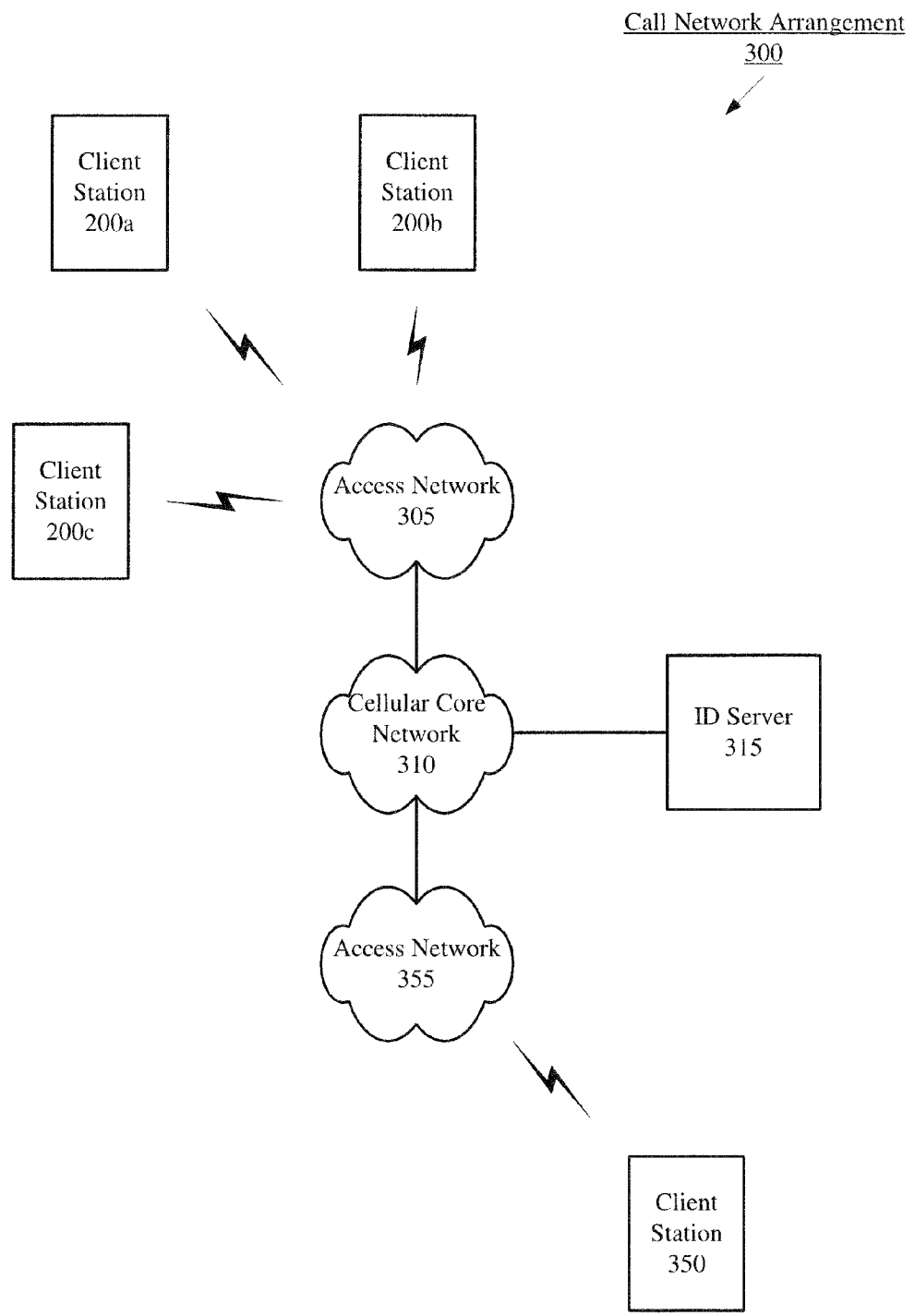
FIG. 3 shows an exemplary call network arrangement, according to various embodiments described herein.

FIG. 3 shows an exemplary call network arrangement 300, according to various embodiments described herein. The call network arrangement 300 may represent a specific embodiment of the network arrangement 100 when the call application 255, the propagation application 240, and the transfer application 245 are used. For example, the call network arrangement 300 includes client stations 200a-c that may represent the client stations 110-114, respectively. The client stations 200a-c may also include the components and applications described above with regard to client station 200 of FIG. 2. As noted above, the client stations 200a-c may also be associated with each other using an association method that will be described in further detail below.

The network arrangement 100 also includes the various different access networks such as the legacy RAN 120, the LTE-RAN 122, and the WLAN 124. The call network arrangement 300 includes an access network 305 that may be any of these various types of access networks. It should be noted that the client stations 200a-c all communicating via the access network 305 may representative of a single access network, a respective access network for each of the client stations 200a-c, or a combination thereof. Via the access network 305, the client stations 200a-c may communicate with the cellular core network 310. The cellular core network 130 of the network arrangement 100 may be substantially similar to cellular core network 310 of the call network arrangement 300 including the above described functionalities thereof.

The call network arrangement 300 further includes an identification (ID) server 315. The ID server 315 may be a portion of the network services backbone 160 described above with regard to the network arrangement 100. Specifically, the ID server 315 may associate the client stations 200a-c under a single user account. This association among the client stations 200a-c may enable the propagation application 245 to provide the call identification upon a call being established. As will be described in further detail below, the ID server 315 may also be configured as an intermediary component that receives the call identification, determines the client stations associated with the source of the call identification transmitting device, and propagates the call identification to the other associated client stations.

The client station 350 may be substantially similar to the client stations 200*a-c*. However, the client station 350 may be a device used by another user. For example, the client station 350 may be independent or unassociated with the client stations 200*a-c*. As related to the call functionality, one of the client stations 200*a-c* may be a first station participating in the call session while the client station 350 may be a second station participating in the call session. Accordingly, the client station 350 may also be connected to the cellular core network 310 using, for example, access network 355, which may or may not be the same as access network 305.

The call network arrangement 300 may provide an architecture in which the call session may be performed as well as for the transfer functionality to be performed. However, prior to performing the transfer functionality, the client stations 200*a-c* may be associated with one another. As discussed above, the ID server 315 may provide this functionality, which is a portion of the network services backbone 160.

Figure 4:
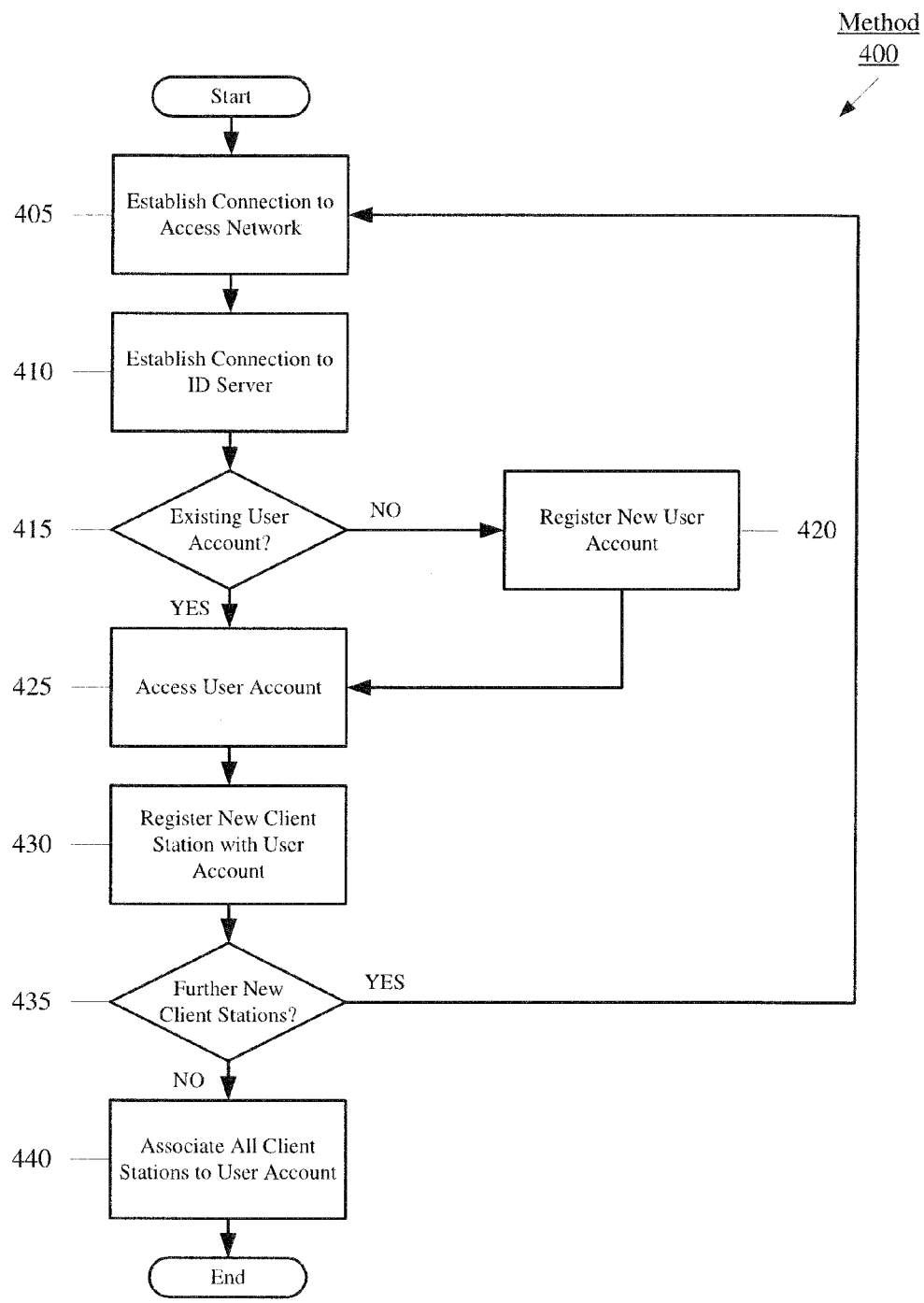
FIG. 4 shows an exemplary method for associating client stations to a user account, according to various embodiments described herein.

FIG. 4 shows an exemplary method 400 for associating the client stations 200*a-c* to a user account, according to various embodiments described herein. The method 400 will be described with regard to the call network arrangement 300 of FIG. 3. As discussed above, the client stations 200*a-c* may be owned or utilized by a single user. It may be assumed that the client stations 200*a-c* are not associated with a user account or among each other.

In 405, the user selects a client station such as client station 200*b* to establish a connection to the access network 305 via, for example, the transceiver 225. As discussed above, the access network 305 may be the legacy RAN 120, the LTE-RAN 122, the WLAN 124, etc. Upon connecting to the access network 305, the client station 200*b* may also establish a connection to the cellular core network 310. Once connected to the cellular core network 310, in 410, the client station 200*b* may further establish a connection to the ID server 315.

In 415, the user of the client station 200*b* may access a user account, which is a feature of the ID server 315. The user may access the user account by, for example, providing a user ID and password for the account. The user account and other user accounts may be stored on a network storage device such as a database. The ID server 315 may retrieve the user account when the user provides the proper information. As discussed above, accessing the user account may also provide access to other functionalities provided by the network services backbone 160. Thus, if the user has already created a user account, the client station 200*b* continues the method 400 to 425 in which the user account is accessed. However, if the user has not created a user account, the client station 200*b* continues the method 400 to 420 in which the user may register a new user account. For example, the user may be prompted to provide various inputs (e.g., name, login name, password, etc.). Subsequently, the client station 200*b* continues the method 400 to 425.

In 430, the client station 200*b* may be registered with the user account. For example, the user may manually provide information specific to the client station 200*b* that identifies the client station 200*b*. In another example, the client station 200*b* may provide information to the ID server 315 that identifies the client station 200*b*. Once the client station 200*b* has been registered with the user account, in 435, further client stations such as client stations 200*a, c* may be registered with the user account. Specifically, each of the client stations a, c may return the method 400 to 405 and perform 405-430. Once all client stations 200*a-c* are registered with the user account, the client stations 200*a-c* continue the method 400 to 440. In 440, the ID server 315 associates all the client stations to the user account as well as to each other.

It should be noted that 435 may be performed at various times. For example, when the user is capable of using all the client stations 200*a-c* concurrently, the registration process may be performed within a single session of accessing the user account on the ID server 315. In another example, the user may only have the client station 200*b*. The user account may be created and the client station 200*b* may be registered thereto. At a subsequent time, the user may purchase the client station 200*a* and register this client station to the user account. Thereafter, the client station 200*a* may be associated with the user account and the previously registered client station 200*b*.

As discussed above, the call may be established between one of the client stations 200*a-c* and the client station 350. For example, the client station 200*b* may perform a call session with the client station 350. Thus, the client station 200*b* may connect to the cellular core network 310 via the access network 305 and the client station 350 may likewise connect to the cellular core network 310 via the access network 355. To perform the call, the client station 200*b* or the client station 350 may originate the call. That is, one of these client stations may transmit the invite for the other client station to answer in order to initiate the call. Each scenario will be discussed where the client station 200*b* originates or receives a call.

Figure 5A:
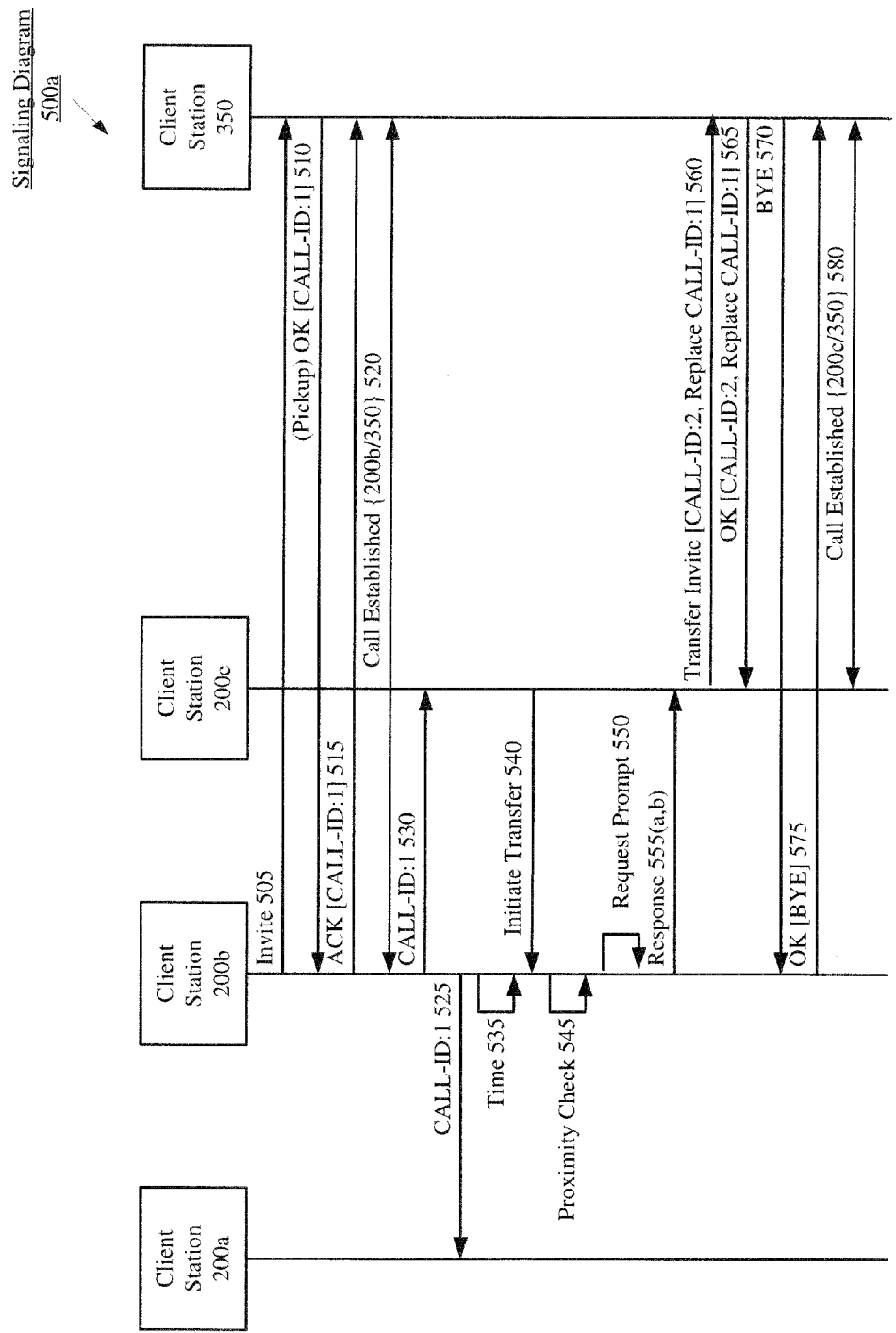
FIG. 5a shows an exemplary signaling diagram for a first manner of transferring a call, according to various embodiments described herein.

FIG. 5*a* shows an exemplary signaling diagram 500*a* for transferring a call, according to various embodiments described herein. Again, for illustrative purposes, the signaling diagram 500*a* is shown where the client station 200*b* is used as the first device to participate in the call session with the client station 350. However, the client stations 200*a, c* may also be used.

When initiating the call, the call application 255 of the client station 200*b* may be used where contact information for the client station 350 is used to generate an invite 505. For example, the call application 255 may store a contact list in the memory 210 that includes a variety of different contacts and respective contact information. In another example, the contact information may be manually entered into client station 200*b* to generate the invite 505. The invite 505 may be, for example, a Session Initiation Protocol (SIP) invite. However, it should be understood that the exemplary embodiments are not limited to any particular type of call setup and may encompass any manner of setting up calls as are supported by the RAN to which the client stations are connected. Upon generating the invite 505, it is transmitted to the client station 350. It should be noted that the invite 505 is transmitted from the client station 200*b* to the client station 350 through various networks and network components. However, for illustrative purposes, only the end points of the transmission are shown in the signaling diagram 500*b*. As discussed above, the invite 505 may be transmitted from the client station 200*b* to the access network 305, the cellular core network 310, the access network 355, and ultimately to the client station 350. Furthermore, other networks and network components may be used to transmit the invite. For example, if the call is for a Voice over IP (VoIP) call, the IMS 150 may also be used.

Once the client station 350 and, more specifically, the call application 255 of the client station 350 receives the invite 505, the client station 350 may display a prompt of the incoming call invitation. For example, the client station 350 may generate an audio signal (e.g., a ring) or sensory signal (e.g., a vibration). The client station 350 may respond to the call invitation 505. Thus, the call application 255 of the client station 350 may generate an OK response 510. The call application 255 of the client station 350 may also generate a call identification to be used for the upcoming call session. For example, the call identification may be CALL-ID:1. The client station 350 may transmit the OK response 510 with the CALL-ID:1. The OK response 510 with the CALL-ID:1 may be transmitted from the client station 350 to the client station 200b using a reverse route through the networks and network components of the invite 505.

The CALL-ID:1 may be the call identification used in a SIP process for the call session between the client station 200b and the client station 350. Specifically, the SIP process may utilize a tuple of a "from-tag," a "to-tag," and a "Call-ID." Thus, in the above process, the "from-tag" may indicate the client station 200b, the "to-tag" may indicate the client station 350, and the "Call-ID" may be the CALL-ID:1. However, the Call-ID may be some other identifier that is assigned to the call that uniquely identifies the call.

The client station 200b may receive the OK response 510 to the invite 505 and determine the CALL-ID:1 included in the OK response 510. The client station 200b may further respond to the OK response 510 by transmitting an acknowledgement (ACK) 515 back to the client station 350. The ACK 515 may also indicate the use of the CALL-ID:1 for the call session. Subsequently, the call 520 may be established between the client station 200b and the client station 350.

According to the exemplary embodiments, once the call has been established, the propagation application 240 of the client station 200b may propagate (at 525, 530) the call identification (i.e., CALL-ID:1) to the client stations 200a, c. Specifically, the propagation application 240 of the client station 200b may transmit the CALL-ID:1 to the ID server 315. The ID server 315 may forward the CALL-ID:1 to the client stations 200a, c. Thus, the client stations 200a, c may store the CALL-ID:1. As discussed above, the client stations 200a-c may all be associated with each other. The ID server 315 may determine that the client station 200b provided the CALL-ID:1 and determine whether there are any client stations that are associated with the client station 200b or with the user account associated with the client station 200b. Upon determining that client stations 200a, c are associated client stations, the ID server 315 may forward the CALL-ID:1 to these associated client stations 200a, c.

It should be noted that the propagation of the CALL-ID:1 to the associated client stations 200a, c may utilize a variety of different security mechanisms. For example, since the client stations 200a, c have already been indicated as being associated with the same user account as the client station 200b and therefore are also associated with each other. In this respect, the client stations 200a-c may know that the other stations are valid and trusted for confidential or proprietary information.

At a subsequent time 535, it may be desirable to transfer the call from the client station 200b to a different client station. For example, the client station 200b may be a desktop terminal and therefore immobile or be a mobile device whose power supply may be nearly depleted. As such, the client station 200c may have an unlimited power supply and be used instead of client station 200b. The client station 200b may nevertheless be used to start the call session 520.

Alternatively, a further client station associated with the user account may attempt to transfer the call. For example, the one or more of the further client stations (e.g., client station 220a or 220c) may be a tablet or a mobile phone associated with the user account.

As noted above, the exemplary embodiments relate to a petition functionality performed by the petition application 250 in which the petition functionality determines whether to display a prompt for permission to transfer the active call using the transfer functionality performed by the transfer application 245 in which the transfer functionality is performed by grabbing the active call. Thus, the client station 200c perform the petition functionality and the transfer functionality.

Specifically, the client station 200c may initiate a call transfer request 540 to transfer the active call from the client station 200b to the client station 200c. Upon receipt of the request from the client station 200b, the petition application 250 of client station 200b may determine whether the client station 200c is within a proximity 545 of client station 200b. The proximity may be a predetermined distance (e.g., 50 meters) between the client stations or a selected connection mode. For example, the connection mode may include at least one of the client station 200b and 200c being connected to a same WiFi network, being connected to each other via a Bluetooth connection, being connected to a same base station (e.g, eNodeB), etc.

If the petition application 250 of the client station 200b determines that the client station 200c is not within the proximity of the client station 200b, the petition application 250 may then prompt 550 the client station 200b with a transfer message. For example, the transfer message may be an audio or visual prompt containing an accept or reject the transfer request. In an exemplary embodiment, the transfer message may, via the display device 215, display an 'Accept' and a 'Reject' button or icon for selection. In another exemplary embodiment, the transfer message may verbally request authorization or rejection to the transfer message via a verbal 'Yes' or 'No' response. The prompt may further indicate which device is requesting the transfer.

If the transfer request prompt 550 is rejected (e.g., the 'Reject' button or icon is selected), the client station 200b may transmit a NO response 555a to the client station 200c. If rejected, the client station 200b may continue the established call with the client station 350. In an exemplary embodiment, the rejection may trigger a cooldown timer, where the cooldown timer may prevent the client station 200c from reinitiating the transfer request for a predetermined time period.

In a further exemplary embodiment, the mobile station 200b may not indicate a response to the transfer request prompt 550. If so, the lack of response may also trigger the client station 200b to transmit a NO response 555a to the client station 200c. For example, the transfer request prompt 550 may be propagated with a timer. The timer may be a predetermined period of time that the transfer request prompt may be used. Thus, upon expiry of the timer, the client station 200b may be triggered to transmit the NO response 555a to the client station 200c.

If the transfer request prompt 550 is accepted (e.g., the 'Accept' button or icon is selected), the client station 200b may transmit an OK response 555b to the client station 200c.

The OK response 555b may indicate to client station 200c to generate an invite 560 that is sent to the client station 350. As discussed above, the SIP tuple includes the "from-tag," the "to-tag," and the "Call-ID" to establish a call session between two client stations. For the client station 200c to replace the client station 200b in an active call session, the client station 200c may use the dialog information. More specifically, the client station 200c may use the CALL-ID:1. Furthermore, the client station 200b has to be able to trust that the client station 200c is a valid and trusted (and not malicious) client station to grab the call. The above manner of propagating the CALL-ID:1 provides the mechanism to provide the CALL-ID:1 to authenticated devices.

Thus, with the CALL-ID:1, the client station 200c is capable of grabbing the active call for the transfer application 245 to perform the transfer functionality. As shown, the client station 200c may transmit a transfer invite 560 that includes another call identification (CALL-ID:2) that is to be used between the client station 200c and the client station 350 for the subsequent transferred call session. It should be noted that in contrast to the original invite 505, the transfer invite 575 may include the call identification information whereas the original invite utilized an OK response to include the call identification information. The transfer invite 575 may also include a command to replace the existing call having the call identification of CALL-ID:1. With the CALL-ID:1 being identical to the CALL-ID:1 information of the active call known by the client station 350, the replace command may be used. It should again be noted that the route through the network and the network components may be substantially similar to that described above for the invite 505 transmitted by the client station 200b to the client station 350.

Upon receiving the transfer invite 560, the client station 350 may determine that the invite 560 is to replace the client station 200b with the client station 200c for the active call session 520 having the call identification of CALL-ID:1. The client station 350 is also to use the call identification of CALL-ID:2 for the transferred call. The client station 350 may respond to the transfer invite 560 by transmitting an OK response 565 back to the client station 200c. The OK response 565 may indicate the use of the CALL-ID:2 for the call session. With the successful grab of the active call session, a teardown is performed for the previous connection between the client station 200b and the client station 350. Thus, the client station 350 may generate and transmit a BYE signal 570 to the client station 200b whereas the client station 200b responds to the BYE signal 570 with an OK response 575 of the BYE signal. Subsequently, the call 580 may be established between the client station 200c and the client station 350.

Using the above manner of propagating the dialog information including the call identification, an active call session between a first client station and a further client station may be transferred to a second client station and the further client station. More specifically, the second client station may grab the active call session from the first client station using the call identification information that was transferred to the second client station by the ID Server 315 because the second client station is related to the first client station.

In an exemplary embodiment, the call transfer process may trigger a transmittal of an advisory to the client station 350. The advisory may be an audio or visual message. For example, the advisory may be an audio recording, such as "please wait while your call is transferred," or a specific tone that indicates that the call is being transferred from client station 200b to client station 200c. The advisory may be stored and transmitted from the IMS 150, the network services backbone 160, or from the client station 200b or 200c.

It should be noted that upon the active call session being transferred from the client station 200b to the client station 200c, the call identification information may again be propagated. Specifically, the CALL-ID:2 may be propagated from the client station 200c to the client stations 200a, b. Again, the CALL-ID:2 may be transmitted from the client station 200c to the ID server 315 which forwards this information to the other client stations 200a, b. In this way, should another transfer be used, the client stations 200a, b may have the call identification information for use in the transfer functionality as discussed above. This process may continue until the call session terminates.

It should also be noted that the call identification information that is propagated may include a timing feature such that the call identification information may be used for a period of time. For example, the call identification information may be propagated with a timer. The timer may be a predetermined period of time that the call identification information may be used. Thus, upon expiry of the timer, the call identification information may no longer be used. However, the exemplary embodiments may include a further mechanism to verify that the call identification information is no longer being used. Specifically, the client stations to which the call identification information was propagated may transmit a query to the ID server 315 that verifies that the call session having the call identification information has terminated. If terminated, an ACK may be transmitted. However, if still ongoing, the ID server 315 may again propagate the call identification information. In another example, the call identification information may be propagated with no time limit. However, the ID server 315 may receive information upon the call session being terminated. This may prompt the ID server 315 to transmit a signal indicating that the call session has terminated and the propagated call identification information may be deleted.

Figure 5B:
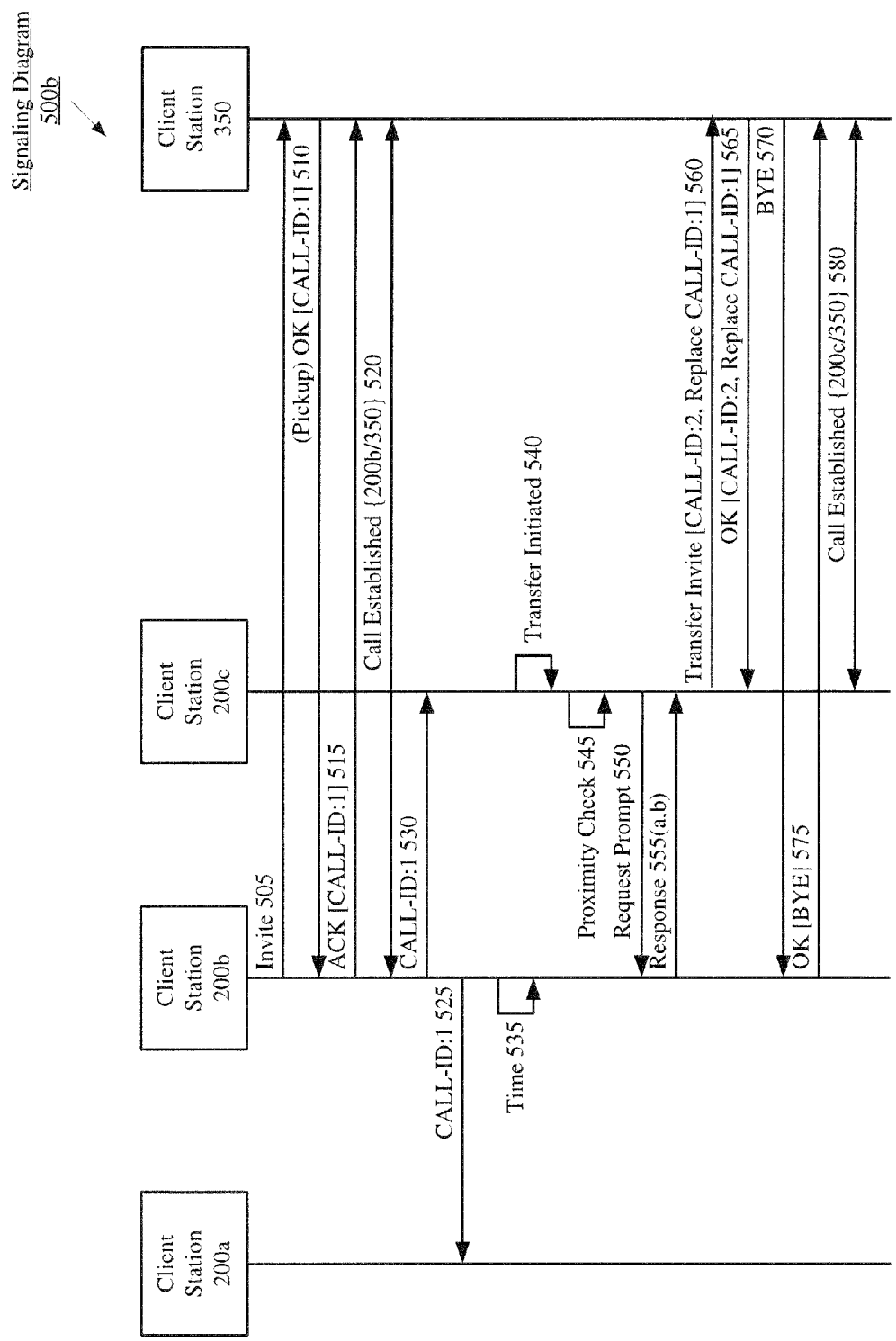
FIG. 5b shows an exemplary signaling diagram for a second manner of transferring a call, according to various embodiments described herein.

FIG. 5b shows an exemplary signaling diagram 500b for transferring a call, according to various embodiments described herein. Again, for illustrative purposes, the signaling diagram 500b is shown where the client station 200b is used as the first device to participate in the call session with the client station 350. However, the client stations 200a, c may also be used.

It should be noted that FIGS. 5a and 5b. vary in which client station performs the proximity check 545. In particular, the method of FIG. 5a discussed an exemplary embodiment where the client station 200b, upon receiving the call transfer request 540, initiated the proximity check 545. Alternatively, FIG. 5b will discuss an exemplary embodiment in which client station 200c performs the proximity check 545.

Following the subsequent time 535, the client station 200c may initiate a call transfer request 540 to transfer the active call from the client station 200b to the client station 200c. Upon request, the petition application 250 of client station 200c may determine whether the client station 200c is within the proximity 545 of client station 200b. If the petition application 250 of client station 200c determines that the client station 200c is not within the proximity of the client station 200b, the petition application 250 may then prompt 550 the client station 200b with a transfer message. For example, as discussed above, the transfer message may be an audio or visual prompt that requests the acceptance or rejection the transfer request.

If the transfer request prompt 550 is rejected, the client station 200b may transmit the NO response 555a to the client station 200c. As before, the client station 200b may continue the established call with the client station 350. If the transfer request prompt 550 is accepted, the client station 200 may transmit an OK response 555b to the client station 200c and the exemplary signaling diagram 500b may continue similarly to signaling diagram 500a.

Figure 6:
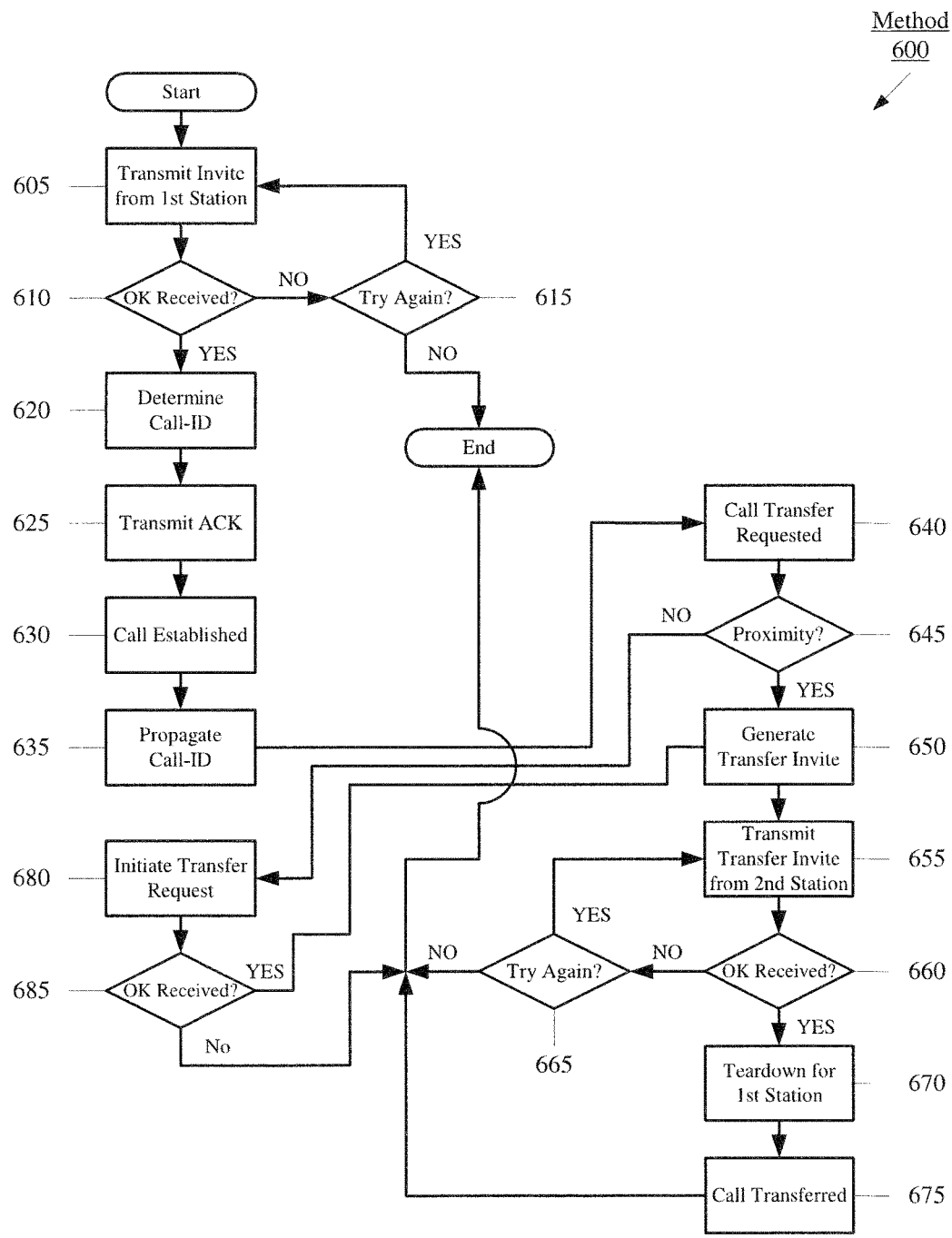
FIG. 6 shows an exemplary method for transferring a call, according to various embodiments described herein.

FIG. 6 shows an exemplary method 600 for determining whether a call should be transferred, according to various embodiments described herein. The method 600 relates to a substantially similar process as described above with regard to the signaling diagrams 500a,b. Thus, the method 600 will be described with regard to the network arrangement 100, the client station 200, and the call network arrangement 300. The method 600 will also be described with regard to the client station 200b being a first participant in a call session and the client station 200c being a second participant in the call session upon performing the petition functionality and the transfer functionality.

In 605, the client station 200b transmits an invite to the client station 350. As discussed above, the call application 255 of the client station 200b may use contact information of the client station 350 to generate the invite. The invite may be transmitted from the client station 200b to the access network 305, the cellular core network 310, the access network 355, and the client station 350. Upon transmitting the invite, in 610, the client station 200b determines whether an OK response is received from the client station 350. For example, the OK response may not be received due to a network error. In another example, the OK response may not be received due to the client station 350 declining the invite. The determination as to whether the OK response is received may be based upon a predetermined time period. Thus, if the OK response is not received in this time period, the client station 200b continues the method 600 to 615 where a further attempt may be made.

If the OK response is received, the client station 200b continues the method 600 to 620. In 620, the client station 200b determines the call identification information included in the OK response. As discussed above, upon receiving the invite, the client station 350 may receive the invite, generate the OK response, generate the call identification to be used for the upcoming call session (e.g., CALL-ID:1), include the call identification in the OK response, and transmit the OK response with the call identification to the client station 200b. Thus, upon receiving OK response, the CALL-ID:1 may be determined. In 625, the client station 200b may transmit an ACK that the OK response was received and acknowledge the CALL-ID:1 for use in the call session. Thereafter, in 630, the call session between the client station 220b and the client station 350 may be established.

In 635, the CALL-ID:1 is propagated from the client station 200b to the client stations 200a, c. As discussed above, the client stations 200a-c may be associated with each other. For the method 600, it may be assumed that the client stations 200a-c have already been properly associated with a user account and with each other prior to the call session being initiated. Thus, the CALL-ID:1 may be transmitted from the client station 200b to the ID server 315 that determines the associated client stations 200a, c and forwards the CALL-ID:1 thereto. The client stations 200a, c may store the CALL-ID:1 on a respective memory 210.

In 640, a call transfer may be initiated by the client station 200c to transfer the call from the client station 200b to the client station 200c. Once initiated, in 645, the client station 200b or the client station 200c may determine whether the client station 200b is within proximity of the client station 200c. As discussed above, the proximity may be the predetermined distance between the client stations or the selected connection mode. If the client station 200c is within the proximity of the client station 200b, the client station 200c continues the method 600 to 650.

In 650, the client station 200c generates a transfer invite. As discussed above, the transfer invite may include a further call identification such as CALL-ID:2 as well as a command to replace the original call identification of CALL-ID:1 with CALL-ID:2. In 655, the client station 200c transmits the transfer invite with the CALL-ID:2 and the replace command to the client station 350. Again, the transfer invite may be transmitted from the client station 200c to the access network 305, the cellular core network 310, the access network 355, and the client station 350.

Upon transmitting the transfer invite, in 660, the client station 200c determines whether an OK response is received from the client station 350. If the OK response is not received, the client station 200c continues the method 600 to 665 where a further attempt may be made. If the OK response is received, the client station 200b continues the method 600 to 670. Specifically, the client station 350 transmits a BYE signal to the client station 200b for the existing connection therebetween for the active call session. The client station 200b may transmit an ACK in response to the BYE signal for the teardown procedure. Further, the advisory notifying the client station 350 that the call is being transferred may also be transmitted to the client station 350. Once the teardown for the connection between the client station 200b and the client station 350 is performed, in 675, the call session may be transferred from the client station 200b to the client station 200c.

Going back to 645, if the client station 200b or the client station 200c determines that the client station 200c is not within the proximity of the client station 200b, the method 600 may continue to 680. In 680, the client station 200b may generate the transfer request prompt or, alternatively, the client station 200c may transmit the transfer request prompt to client station 200b. In 685, in response to the transfer request prompt, the client station 200c determines whether an OK response is received from the client station 200b. If the OK response is received, the client station 200c continues the method 600 to 650, as discussed above. However, if the NO response is received, the call session continues between the client station 220b and the client station 350.

It should be noted that the above described method 600 may include further operations. For example, as discussed above, the further call identification of CALL-ID:2 that is used for the connection in the call session between the client station 200c and the client station 350 may also be propagated. Thus, the client station 200c may continue the method 600 to return to 635.

In an exemplary embodiment, client stations 200a-200c may be structured according to a hierarchy. In particular, the client station 200c may be designated as a primary, or a master, user station and the client stations 200a and 200b may be designated as a secondary, or a companion, user station. For example, client station 200c, as the primary, may be a mobile phone while client station 200a and 200b, as the secondaries, may be a wearable and a tablet, respectively. This hierarchy of devices may be stored in the network services backbone 160 (e.g., as part of the associations among the different client stations). As such, and as applied to the above-described exemplary embodiments, the tablet (e.g., client device 200b) may be participating in the active call, which is one of the secondary devices. Thus, in the above example, during the active call, the mobile phone (e.g., client station 200c), which is the primary device, is the device that is attempting to 'grab' the active call from the secondary device.

Those skilled in the art will understand that the implementation of the hierarchy is not required. Further, those skilled in the art would also understand that the designations of 'primary' and 'secondary' on the client devices may selected and altered.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
   at a first station;
   receiving a first call identification of a first communication session between the first station and a second station;
   receiving a request, from a third station, to allow the first communication session to be transferred from the first station to the third station;
   performing a proximity check between the first station and the third station;
   when the proximity check indicates that the first station and the third station are outside of a predetermined proximity of each other, displaying a prompt on the first station for permission to allow the first communication session to be transferred to the third station; and
   when the permission is received, transmitting a response, to the third station, granting permission to transfer the first communication session from the first station to the third station.

2. The method of claim 1, wherein the first station is a secondary station of a user account and the third station is a primary station of the user account.

3. The method of claim 1, further comprising:
   bypassing the prompting when the proximity check indicates that the first station and the third station are within the predetermined proximity of each other.

4. The method of claim 1, wherein the proximity check comprises determining whether the first station and the third station are within a predetermined distance of each other.

5. The method of claim 1, wherein the proximity check comprises determining whether the first station and the third station are utilizing a same connection mode.

6. The method of claim 5, wherein the connection mode comprises a WiFi connection, a Bluetooth connection, or a base station connection.

7. The method of claim 1, further comprising;
   triggering a network to transmit an advisory to the second station, the advisory indicating to the second station of the transfer of the first communication session from the first station to the third station.

8. The method of claim 7, wherein the advisory comprises at least one of an audio recording or a visual message.

9. A method, comprising:
   at a first station;
   receiving a first call identification of a first communication session between a second station and a third station;
   transmitting a request to allow the first communication session to be transferred from the second station to the first station, wherein the request prompts the second station for permission to allow the first communication session to be transferred to the first station;
   receiving permission from the second station to transfer the first communication session from the second station to the first station;
   performing a proximity check between the first station and the second station;
   when the proximity check indicates that the first station and the second station are outside of a predetermined proximity of each other, transmitting an invite including the first call identification and a second call identification to the third station, wherein the invite indicates to the third station that the first communication session with the second station is to be terminated and a second communication session with the first station is to be established, wherein the second communication session is identified by the second call identification; and
   establishing the second communication session with the third station.

10. The method of claim 9, wherein the first station is a primary station of a user account and the second station is a secondary station of the user account.

11. The method of claim 9, further comprising;
    bypassing transmitting the request when the proximity check indicates that the first station and the second station are within the proximity of each other.

12. The method of claim 9, wherein the proximity check comprises determining whether the first station and the second station are within a predetermined distance of each other.

13. The method of claim 9, wherein the proximity check comprises determining whether the first station and the second station are utilizing a same connection mode.

14. The method of claim 13, wherein the connection mode comprises a WiFi connection, a Bluetooth connection, or a base station connection.

15. The method of claim 9, further comprising;
    triggering a network to transmit an advisory to the third station, the advisory indicating to the third station of the transfer of the first communication session from the second station to the first station.

16. The method of claim 15, wherein the advisory comprises at least one of an audio recording or a visual message.

17. A first station, comprising;
    a transceiver configured to transmit data and receive data, wherein the data is associated with a first communication session; and
    a processor configured to:
    receive a first call identification of the first communication session between the first station and a second station;

receive a request, from a third station, to allow the first communication session to be transferred from the first station to the third station;

perform a proximity check between the first station and the third station;

when the proximity check indicates that the first station and the third station are outside of a predetermined proximity of each other, display a prompt on the first station for permission to allow the first communication session to be transferred to the third station; and when the permission is received, transmit a response, to the third station, granting permission to transfer the first communication session from the first station to the third station.

18. The first station of claim 17, wherein the first station is a secondary station of a user account and the third station is a primary station of the user account.

19. The first station of claim 17, wherein the proximity check comprises determining whether the first station and the third station are within the predetermined distance of each other.

20. The first station of claim 17, wherein the proximity check comprises determining whether the first station and the third are utilizing a same connection mode.

* * * * *